United States Patent Office 2,918,613
Patented Dec. 22, 1959

2,918,613

HIGH CONDUCTIVITY SELENIUM RECTIFIER

Charles A. Escoffery, Los Angeles, Calif., assignor to International Rectifier Corporation, El Segundo, Calif., a corporation of California No Drawing. Application April 8, 1957
Serial No. 651,159

4 Claims. (Cl. 317—241)

This invention relates to selenium rectifiers and has for an object to provide such a rectifier which is characterized by a relatively high resistance to current flow in the reverse direction and a relatively low resistance to current flow in the forward direction.

Briefly, such a rectifier includes a metal base plate which may be made of a ferrous metal or aluminum which is preferably roughened and also preferably nickel coated on its upper surface to receive and hold a layer of crystallized selenium. Over the selenium layer there is anothere layer called the counterelectrode, ordinarily of an alloy such as alloy of cadmium and bismuth, which elements may be present in the alloy in about equal proportions by weight. Such an element is made into a rectifier by an electroforming process which can be carried out by application of an A.C. voltage across the base plate and counterelectrode, ordinarily in series with some resistance. This will develop a barrier layer between the selenium and the counterelectrode which produces the rectifying action. Such selenium elements and the methods of making them are well known in the art and need no detailed explanation here. The layer of selenium is known as a semi-conductor, as it functions to conduct current much more readily in one direction than in the other, which property produces the rectifying action.

Dry plate selenium rectifiers of this type are connected in a circuit by use of a suitable conductive contact element which makes a substantial surface contact with the counterelectrode; the element has as one of its terminals the base plate and as the other terminal the counterelectrode or the contact element in contact with it.

Ordinarily, many other substances than selenium are found with selenium, and such other substances constitute impurities which impair the efficiency of rectifiers made with the selenium. In particular, the impurities reduce the voltage which the selenium rectifier can withstand; and it is well known that the voltage and leakage characteristics of selenium rectifiers are improved by use of pure selenium. Inasmuch as the selenium for use in rectifiers should be highly purified there has been developed a type of selenium known for its purity as the "pure" or "rectifier type" selenium. Such selenium contains substantially no impurities whatever.

I have found, however, that the addition of a relatively small amount of tellurium to the otherwise pure selenium improves the forward conductivity beyond that which is obtainable in a rectifier made from pure selenium. In accordance with the present invention, I improve the forward conductivity of a selenium rectifier by adding to it between five and twenty parts by weight of tellurium per million parts by weight of selenium. I have found that if less than this proportion of tellurium is present, the forward resistance of the rectifier will be undesirably higher; and if a greater proportion is used, the voltage-withstanding ability will be noticeably lower than the reverse current flow will be undesirably higher.

The use of tellurium in a selenium rectifier has been proposed heretofore in Lidow Patent 2,736,850, issued February 28, 1956. In said Lidow patent, the tellurium is added for a different purpose than to improve the forward current conductivity. In the Lidow patent, the purpose of the tellurium is to stabilize the rectifier; and to carry out its object of stabilization, the tellurium is present in the far greater proportion of about twelve hundred to one million parts selenium.

While the said Lidow patent does not teach a proportion of tellurium which results in the high forward conductivity of the present invention, the method of making a rectifier according to the present invention can be similar to that proposed in the said Lidow patent.

My discovery that there is this narrow critical range of about five to twenty parts of tellurium per million parts of selenium which results in a good forward conductivity while retaining good rectifying action is unexpected, for it has heretofore generally been understood that the effect of adding tellurium to selenium was to impair the rectifying characteristics, that is, its efficiency.

The tellurium can be added to the selenium in any convenient manner. For example if the rectifier is made by the well-known method of melting an amorphous selenium powder and spreading it on the base plate, followed by crystallization by means of heat treatment, the tellurium can be added to the amorphous selenium in the form of a powder which is then thoroughly mixed with the selenium-tellurium powder for uniformity of composition. In this process the selenium-tellurium powder mixture can be melted and applied to the base plate in the same way as selenium alone would be applied to the base plate. The heat treatment can then be carried out in the same way as with selenium alone. This can be done, for example, by heating the solidified selenium-tellurium layer on the base plate for about an hour at a temperature of about 217° C., which is a few degrees below the melting point of selenium. To aid the crystallization, pressure can be applied if desired, by placing a pressure platen over the selenium-tellurium layer and applying a pressure of, for example, around 1000 pounds per square inch.

Another way of making the rectifier is to mix the tellurium powder with the selenium powder and apply the powder mixture to the base plate by the so-called pressed powder method. This involves thoroughly mixing the selenium-tellurium powder to a homogeneous mixture and then sprinkling the powder on the base plate, after which a pressure platen can be applied to the surface of the powder thus compressing the powder against the base plate at a pressure of around 1000 pounds per square inch and at a temperature of 125 to 130° C. for one or two minutes, thereby producing a sintering and coalescing of the powder and close adherence to the base plate. This will then be followed by the above-mentioned annealing treatment performed by heating for a time such as a half hour or an hour at around 217° C. This will result in a selenium layer containing the small proportion of tellurium.

Regardless of how the selenium-tellurium layer is applied to the base plate, the counterelectrode can be applied to the selenium-tellurium surface in a well-known manner, for example, by spraying in a molten form a substance such as Wood's metal or some other alloy such as a cadmium-bismuth alloy. Where such an alloy is used, the cadmium and bismuth can be used in about equal parts by weight.

Other additives than tellurium may if desired be added to the selenium for particular purposes in addition to the tellurium. For example, chlorine, or other halogen, may be added as is a common practice in the preparation of selenium for use in rectifiers. Since the use of other additives than tellurium is no part of the present invention, no further details relating to them need be given here.

This invention is not to be limited by the embodiments described in the description which are given by way of example and not of limitation, but only in accordance with the scope of the appended claims.

I claim:

1. A selenium rectifier having a base plate, a semi-conductor layer on the base plate, and a counter-electrode layer over the semi-conducting layer, said semi-conductor layer comprising a mixture of pure selenium and tellurium in the proportion of about 5 to 20 parts tellurium and one million parts pure selenium by weight, whereby the conductivity of the rectifier in the forward direction of current flow is increased over the conductivity of a similar rectifier made with pure selenium without the tellurium.

2. In a dry plate rectifier of the type having a base plate, a semi-conductor layer over the base plate comprising pure selenium and a counter-electrode layer over the semi-conductor layer, the improvement which comprises adding about 5 to 20 parts by weight of tellurium per million parts by weight of selenium into the semi-conductor layer, whereby the conductivity of the rectifier in the forward direction is increased over the conductivity of a similar rectifier made with pure selenium without the tellurium.

3. A selenium rectifier having a base plate, a semi-conductor layer on said base plate and a counter-electrode layer over the semi-conductor layer, said semi-conductor layer consisting of a mixture of pure selenium and tellurium in the proportion of about 5 to 20 parts tellurium and one million parts of selenium by weight, whereby the conductivity of the rectifier in the forward direction is increased over the conductivity of a similar rectifier made with pure selenium without the tellurium.

4. In a dry plate rectifier of the type having a base plate, a semi-conductor layer over the base plate consisting of pure selenium and a counter-electrode layer over the semi-conductor layer, the improvement which comprises adding about 5 to 20 parts by weight of the tellurium per million parts by weight of pure selenium into the semi-conductor layer, whereby the conductivity of the rectifier in the forward direction is increased over the conductivity of a similar rectifier made with pure selenium without the tellurium.

References Cited in the file of this patent

UNITED STATES PATENTS 2,736,850    Lidow _____ Feb. 28, 1956